J. MURPHY.
Vulcanized Rubber Fabric for Belting.

No. 198,496. Patented Dec. 25, 1877.

Witnesses:

Inventor:
John Murphy

UNITED STATES PATENT OFFICE.

JOHN MURPHY, OF BROOKLYN, ASSIGNOR TO THE GUTTA PERCHA AND RUBBER MANUFACTURING COMPANY, OF NEW YORK, N. Y.

IMPROVEMENT IN VULCANIZED-RUBBER FABRICS FOR BELTING.

Specification forming part of Letters Patent No. 198,496, dated December 25, 1877; application filed December 7, 1877.

*To all whom it may concern:*

Be it known that I, JOHN MURPHY, of Brooklyn, in the county of Kings and State of New York, have invented certain new and useful Improvements in Vulcanized - Rubber Fabrics for Belting; and I do hereby declare that the following is a full, clear, and exact description thereof, which will enable others skilled in the art to which it appertains to make and use the same, reference being had to the accompanying drawings, and to letters of reference marked thereon, which form a part of this specification—

Figure 1:
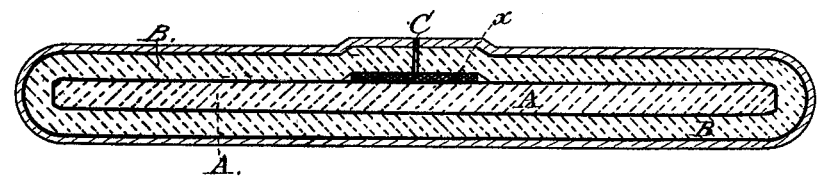
Figure 2:
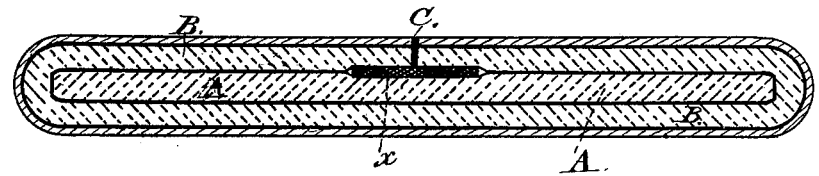

Figure 1 showing a belt unfinished; Fig. 2 showing a belt as it comes from the press finished.

The manner of making a three-ply belt is as follows: Two pieces of cloth, of the required length, are coated with unvulcanized rubber gum in calenders, in the ordinary manner, and two strips with straight and parallel edges are cut from them—one to be a little less wide than the width of the belt required, (indicated in the drawings by letter A,) and another one a little more than twice the width of the required belt, (indicated by letter B.) Then the narrow strip is placed upon the wide one right in its center, so as to be at equal distances from the edge of the latter, and then made to adhere by rolling or otherwise. Then that portion of the strip B which adheres at each side of the inner strip A is bent over the edges of the inner strip A, flattened down upon the top side of the latter, where the edges of the outer strip B will butt together at the center of the inner strip A—viz., at C in the drawings. The belt is then placed between the plates of a hot press, and thus vulcanized.

A four-ply belt is made by inserting two narrow strips between the folds of the outside one.

A belt so made, after some wear, is apt to separate its outer ply from the inner ones, and this separation invariably commences at letter C, where the two edges of the outer ply butt. The tendency to separate is owing to the scarcity of the rubber coating of the cloth on the inner sides, which is commanded by economy, the rubber not being sufficient to penetrate the meshes of the cloth.

The object of my invention is to overcome this difficulty, and fasten the edges of the outer ply more firmly to the surface of the adjoining inner ply or inner plies, without adding much to the expense of the belt, by laying an extra strip, $x$, of sheet-rubber, prepared for vulcanization, about one inch (more or less) wide, and of suitable thickness on the top of the uppermost inner ply, and in the center thereof, and then bringing the two edges of the outer ply upon this strip $x$, as clearly shown in the drawing. When the belt is now placed in the hot press for curing, the rubber of this extra strip will be pressed into the meshes of the outer ply, and also into the meshes of the adjoining inner ply, and thus fasten securely the edges of the one to the surface of the other.

This extra strip is made of any of the vulcanizable compounds of rubber, or rubber and gutta-percha, either of the usual color or with the addition of red or other pigment.

It is of advantage to color the strengthening-strip red or some other positive color, for the reason that any one can thereby easily recognize belting which has my improvement, and by that test be able to distinguish it from the articles which are inferior for the want of it.

What I claim as my invention is—

The extra strip of sheet-rubber inserted between the outer and the adjoining inner ply or inner plies of the belt, and right under the butt-joints of the outer ply, for the purpose of increasing the adhesion between the edges of the outer ply and the surface of the adjoining inner ply or inner plies, as set forth.

In testimony that I claim the foregoing as my own I affix my signature in presence of two witnesses.

JOHN MURPHY.

Witnesses:
 GEO. W. POUCHER,
 A. SPADONE.